United States Patent
Bauer et al.

(10) Patent No.: US 8,336,315 B2
(45) Date of Patent: Dec. 25, 2012

(54) GAS TURBINE WITH A COMPRESSOR HOUSING WHICH IS PROTECTED AGAINST COOLING DOWN AND METHOD FOR OPERATING A GAS TURBINE

(75) Inventors: Holger Bauer, Hardthausen (DE); Bernhard Küsters, Kamp-Lintfort (DE); Dieter Minninger, Dinslaken (DE); Marc Mittelbach, Heiligenhaus (DE); Andreas Peters, Ratingen (DE); Stephan Schmidt, Essen (DE); Steffen Skreba, Essen (DE); Bernd Stöcker, Oberhausen (DE)

(73) Assignee: Siemens Aktiengesellschaft, Munich (DE)

( * ) Notice: Subject to any disclaimer, the term of this patent is extended or adjusted under 35 U.S.C. 154(b) by 1279 days.

(21) Appl. No.: 10/589,929

(22) PCT Filed: Jan. 31, 2005

(86) PCT No.: PCT/EP2005/000925
§ 371 (c)(1),
(2), (4) Date: Aug. 20, 2007

(87) PCT Pub. No.: WO2005/090755
PCT Pub. Date: Sep. 29, 2005

(65) Prior Publication Data
US 2007/0289286 A1    Dec. 20, 2007

(30) Foreign Application Priority Data
Feb. 18, 2004  (EP) .................................. 04003669

(51) Int. Cl.
*F02C 6/08*    (2006.01)

(52) U.S. Cl. .......................................................... 60/782
(58) Field of Classification Search .................... 60/782, 60/785, 795; 415/116, 115
See application file for complete search history.

(56) References Cited

U.S. PATENT DOCUMENTS

| | | | |
|---|---|---|---|
| 2,837,270 A * | 6/1958 | Chapman ........................ | 415/17 |
| 2,951,340 A | 9/1960 | Howald | |
| 3,632,221 A | 1/1972 | Uehling | |
| 3,694,102 A * | 9/1972 | Conrad ......................... | 415/115 |
| 3,736,069 A | 5/1973 | Beam, Jr. et al. | |
| 4,213,738 A | 7/1980 | Williams | |
| 4,332,133 A | 6/1982 | Schwarz et al. | |
| 4,702,070 A * | 10/1987 | Cureton et al. ................. | 60/785 |
| 5,154,578 A | 10/1992 | Miraucourt et al. | |
| 5,203,162 A * | 4/1993 | Burge ............. | 60/785 |
| 5,297,386 A * | 3/1994 | Kervistin ..................... | 60/226.1 |
| 5,488,823 A * | 2/1996 | Faulkner et al. ................ | 60/783 |
| 5,525,032 A * | 6/1996 | Kreis et al. ......................... | 415/1 |
| 5,605,437 A | 2/1997 | Meylan | |
| 6,004,095 A * | 12/1999 | Waitz et al. ................... | 415/119 |
| 6,120,249 A | 9/2000 | Hultgren et al. | |
| 6,574,965 B1 * | 6/2003 | Feulner .......................... | 60/785 |
| 7,077,623 B2 * | 7/2006 | Guemmer ..................... | 415/58.5 |
| 7,581,920 B2 * | 9/2009 | Lardellier ......................... | 415/1 |

FOREIGN PATENT DOCUMENTS

| EP | 0 791 127 B1 | 8/1997 |
|---|---|---|
| EP | 0 988 441 B1 | 3/2000 |

(Continued)

*Primary Examiner* — Phutthiwat Wongwian

(57) ABSTRACT

A gas turbine, comprising a turbine and a compressor provided with a compressor housing, and to a method for the operation thereof. The compressor is tapped in order to cool the turbine by means of at least one tap line for removing compressed or partially compressed air. The tap line comprises a locking device, particularly a valve, in order to regulate the outflow of tapped air and thus the cooling of the housing.

7 Claims, 4 Drawing Sheets

FOREIGN PATENT DOCUMENTS

| | | |
|---|---|---|
| EP | 1 245 809 A1 | 10/2002 |
| JP | 61001809 A | 1/1986 |
| JP | 63289230 A | 11/1988 |
| WO | WO 01/55559 A1 | 8/2001 |

* cited by examiner

GAS TURBINE WITH A COMPRESSOR HOUSING WHICH IS PROTECTED AGAINST COOLING DOWN AND METHOD FOR OPERATING A GAS TURBINE

CROSS REFERENCE TO RELATED APPLICATIONS

This application is the US National Stage of International Application No. PCT/EP5/000925, filed Jan. 31, 2005 and claims the benefit thereof. The International Application claims the benefits of European Patent application No. 04003669.1 filed Feb. 18, 2004. All of the applications are incorporated by reference herein in their entirety.

FIELD OF THE INVENTION

The present invention relates to a gas turbine having a compressor housing which is protected against cooling down, in particular against cooling off or cooling down too rapidly. Accordingly, the present invention relates not only to the gas turbine in its entirety, but rather also the compressor having a compressor housing protected against cooling down and the compressor housing itself. Furthermore, the present invention relates to a method for operating such a gas turbine.

BACKGROUND OF THE INVENTION

Gas turbines are generally known. Diverse cooling devices are also known for gas turbines. Such cooling devices essentially relate, however, to cooling in the area of a combustion chamber or a turbine section of the gas turbine, cf., for example, EP 0 988 441, which is concerned with cooling of the combustion chamber wall, or EP 0 791 127 B1, EP 1 245 806 A1; WO 01/55559 A1, or U.S. Pat. No. 6,120,249, all of which are concerned with the cooling of turbine blades.

In addition, an aircraft gas turbine having a compressor is known from U.S. Pat. No. 4,332,133. The compressor is tapped to cool the turbine using a tap line for removing compressed or partially compressed air, the tap line having a valve for setting the cooling air flow.

U.S. Pat. No. 3,736,069 discloses a gas turbine having controllable cooling of the turbine blades, which are subjected to a hot gas. For this purpose, a ring element lies opposite a valve seat, which, due to different coefficients of thermal expansion, causes a changeable gap. The flow of the coolant is thus set.

U.S. Pat. No. 4,213,738 also discloses a flow path for a coolant air system having a changeable gap, which the coolant air may flow through, for setting the cooling.

Adjustable cooling for gas turbines is also known from U.S. Pat. No. 2,951,340 and from U.S. Pat. No. 3,632,221.

Furthermore, U.S. Pat. No. 5,154,578 discloses a compressor housing of an aircraft gas turbine, in which the radial supports connecting an external housing and an internal housing of the compressor may have a heating or cooling medium flow through them to set the radial gap of the rotor blades of the compressor.

In addition, U.S. Pat. No. 5,605,437 discloses a device situated in the compressor housing for reducing the oscillations of the radial gap of freestanding guide blades of the compressor. The guide blade rings each have a base ring channel, i.e., situated in the compressor housing, for this purpose, which a heating medium may flow through. The ring channels are connected to one another by overflow channels, so that the heating medium may flow through the ring channels sequentially independently of the compressor operation.

SUMMARY OF THE INVENTION

The present invention comprises specifying a possibility, using which the cooling down of the compressor housing is prevented or at least delayed to reduce the danger of contacts between elements cooling slower and faster, i.e., for example, the housing and the rotor.

Until now, in regard to the problem of the contact danger, it has only been suggested that the spacings between such elements, in particular the radial gaps between rotor and housing inner wall, be designed as sufficiently large.

This object is achieved according to the present invention by the features of the claims. For this purpose, in a gas turbine having a turbine and a compressor comprising a compressor housing, the compressor being tapped to cool the turbine using at least one tap line to remove compressed or partially compressed air, the tap line has a locking device, in particularly a valve. The same object is also achieved by a compressor or a compressor housing having the features of the claims.

Furthermore, the object is achieved by a method for operating such a gas turbine having the features of the claims, in which the locking device, particularly the valve, is closed or partially closed as the gas turbine is shut down.

The present invention is based on the recognition that in a gas turbine, specific elements cool off more rapidly than other elements. The elements which cool off more rapidly are particularly the elements in direct contact with the volume of ambient air, i.e., for example, the housing of the gas turbine or parts of this housing, in particular the compressor housing. Other parts, such as the rotor, i.e., the turbine shaft having the blades attached thereto, in the interior of the turbine, cool off significantly more slowly. This constellation makes it necessary to provide sufficient spacings, e.g., between the rotor and the surrounding housing, whose dimensions are determined by the extent of the thermal expansion of the participating elements. The smallest spacing between rotor and housing exists in the area of the ends of the blades of the rotor. The spacing between the ends of these blades and the housing is referred to as the radial gap. In the event of a warm start, i.e., if the gas turbine is started with the rotor only partially cooled off but the housing already largely cooled off, the danger of wedging of the rotor in the housing results if the radial gap is not dimensioned sufficiently large. The observation of the warm start is accordingly also the limiting criterion in the layout of the geometries of the radial gaps between rotor and housing, because grazing of the blades on the housing inner wall must be avoided under all circumstances.

The advantage of the present invention is that due to the locking device, the heat loss of the compressor housing is regulatable. As the gas turbine is shut down, the locking device is closed or partially closed to achieve a defined heat loss of the compressor housing. In this way, it may be ensured that the compressor housing and the rotor rotating therein cool off to approximately the same extent. The uniform cooling is ensured at least enough that the danger of grazing of the rotor on the interior of the compressor housing is minimized.

Furthermore, the tap line has a cavity which lies in front of the locking device in the flow direction of the removed or removable air. The volume of the cavity thus acts like a thermal insulator. Air is well-known as a good thermal insulator. Air having a temperature which essentially corresponds to the temperature of the rotor is contained in the cavity. The cavity thus prevents or delays cooling off or cooling down of the compressor housing due to the insulating effect.

Furthermore, if the cavity in the housing of the compressor is shaped in such a way that, originating from a position of an inlet of the tap line and a stationary blade located in this area, it extends at least up into the area of a next following stationary blade, an enlarged active area of the cavity functioning as an insulator results.

The dependent claims are directed to preferred embodiments of the present invention.

If the cavity extends up into the area of a next following stationary blade in the direction of the inflow of the ambient air into the compressor, the longitudinal extension of the cavity corresponds to the flow direction of the ambient air and thus the main direction of a temperature gradient in the compressor housing.

A further special feature of the present invention is that a locking element is assigned to the cavity, so that the volume of the cavity may be partitioned off from the volume flow through the compressor housing.

The advantage of the present invention and its embodiments is also that the or each cavity may also be used for the purpose of cooling the housing of the rear compressor stages. In this way, the thermally caused total expansion of the flow channel in the compressor is reduced. The tap air may correspondingly be removed from the housing further "to the rear".

BRIEF DESCRIPTION OF THE DRAWINGS

In the following, an exemplary embodiment of the present invention is explained in greater detail on the basis of the drawing. Objects or elements corresponding to one another are provided with identical reference numerals in all figures.

DETAILED DESCRIPTION OF THE INVENTION

A gas turbine and its mode of operation are generally known. Accordingly, a gas turbine has a compressor for combustion air, a combustion chamber, as well as a turbine for driving both the compressor and also a work machine, such as a generator. For this purpose, the turbine and the compressor are situated on a joint turbine shaft, also referred to as a runner, to which the work machine is also connected, and which is mounted so it is rotatable around its longitudinal axis. The combustion chamber is equipped with at least one burner for combusting a liquid or gaseous fuel.

The compressor and also the turbine each have a number of rotatable rotor blades, which are connected to the turbine shaft. The rotor blades are situated in a ring shape on the turbine shaft and thus form a number of rotor blade rows. Furthermore, both the compressor and also the turbine comprise a number of fixed guide blades, which are also attached in a ring shape to an inner wall of the housing of the compressor or turbine to form guide blade rows. In the turbine, the rotor blades are used for driving the turbine shaft through impulse transmission from the operating medium flowing through the turbine. The guide blades, in contrast, are used for guiding the flow of the operating medium between each two sequential rotor blade rows or rotor blade rings, viewed in the flow direction of the operating medium. A sequential pair made of a ring of guide blades or a guide blade row and a ring of rotor blades or a rotor blade row is also referred to as a turbine stage or as a compressor stage.

Figure 1:
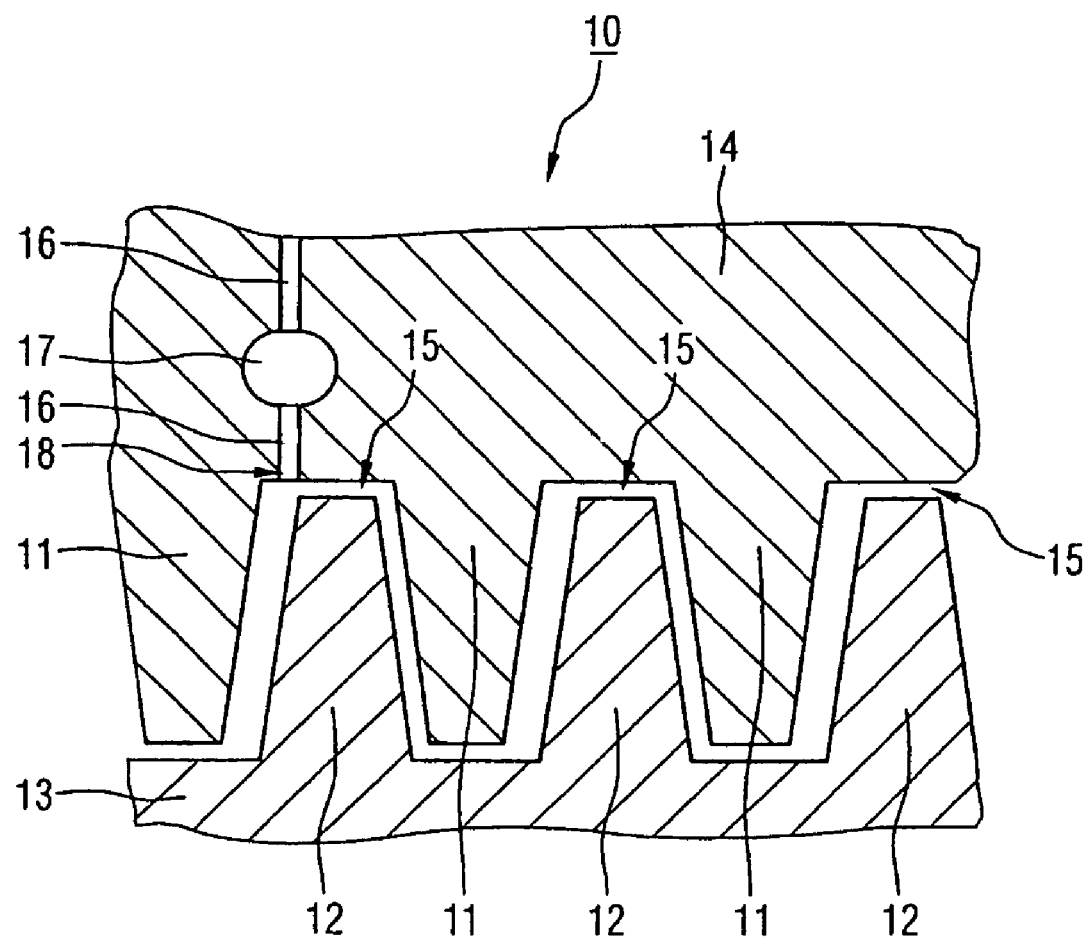
FIG. 1 shows a detail from a partial section through a gas turbine in the area of the compressor.

FIG. 1 shows a detail from the compressor, identified as a whole by 10, of a gas turbine in a vertical section along the longitudinal axis of such a gas turbine. The alternating sequence of stationary blades 11 and rotating blades, which are attached for this purpose to a turbine shaft 13, is shown. A radial gap 15 remains between the rotating blades 12 and the stationary blades 11 as a component of the housing 14 of the gas turbine or the compressor 10 of the gas turbine.

During operation, the compressor 10 sucks in ambient air and compresses it. The air flows through the compressor 10 in a direction from left to right in relation to the illustration in FIG. 1. A part of the air which penetrates into the compressor 10 is removed after partial compression and used to cool the stationary blades in the turbine section of the gas turbine (not shown). These heat up especially because of the hot compressed gas coming out of the or each burner and conducted into the turbine section. The hot compressed gas flows through the rows of stationary and rotating blades in the turbine section, where the gas expands and generates power which sets the turbine shaft 13 into rotation. For cooling at least the stationary blades in the turbine section, compressed or partially compressed ambient air is taken from the compressor 10 using a tap line 16; the compressor is "tapped". A cavity 17, i.e., a cavity in the housing 14, is provided in the course of the tap line 16. An inlet 18 of the tap line 16 is located in the area of one of the rotating blades 12 on the interior of the housing 14.

Figure 2:
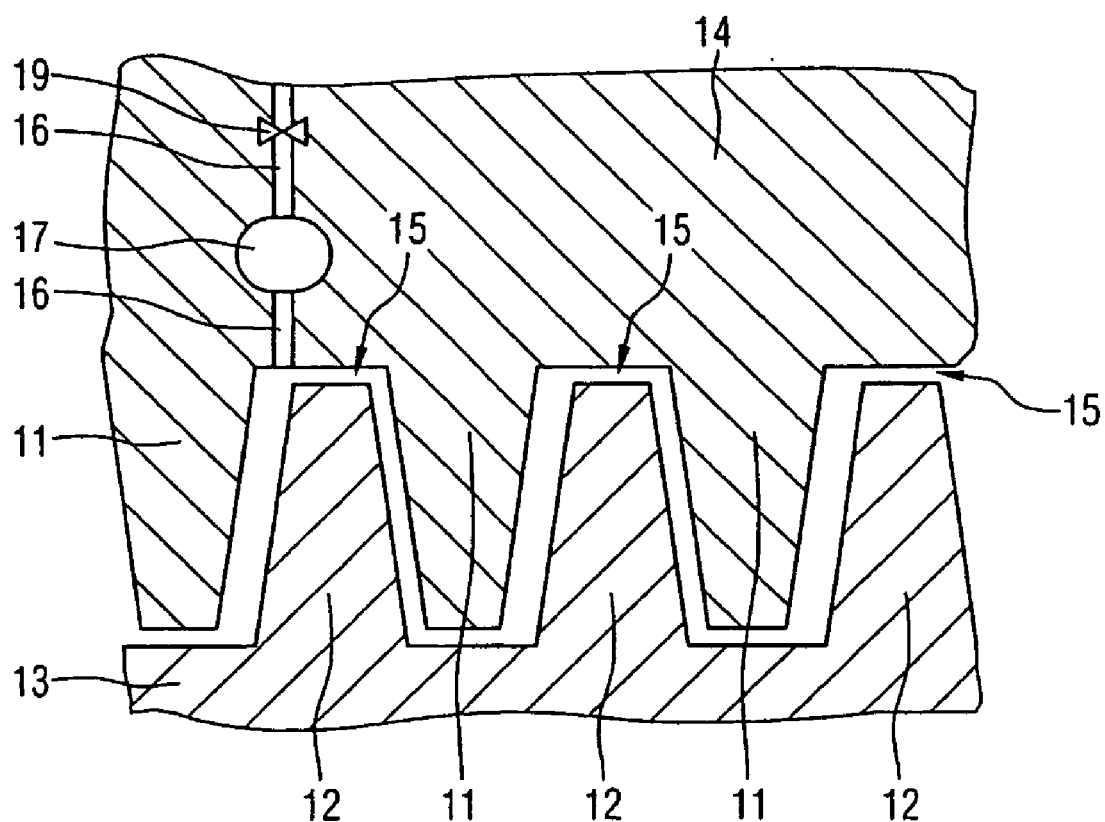
FIG. 2 shows the detail according to FIG. 1 having a tap line lockable by a locking device.

FIG. 2 shows the tap line 16 modified according to the present invention. To prevent the cooling off or cooling down of the housing 14 of the compressor, the tap line 16 is lockable or at least partially lockable to prevent or reduce the outflow of air through the tap line 16. For this purpose, a locking device shown as a valve 19 is provided in the tap line 16.

By actuating valve 19 in way known per se, the tap line 16 may be partially or completely locked. Ambient air then no longer flows or only flows to a reduced extent through the tap line 16. The heat loss otherwise connected to the outflow of the ambient air is correspondingly prevented or reduced.

Because the valve 19 is located behind the cavity 17 in the flow direction of the ambient air through the tap line 16, the cavity 17 is also entirely or partially closed upon actuation of the valve 19. The cavity 17 acts like an insulator and additionally effectively prevents the cooling down of the compressor housing 14.

Figure 3:
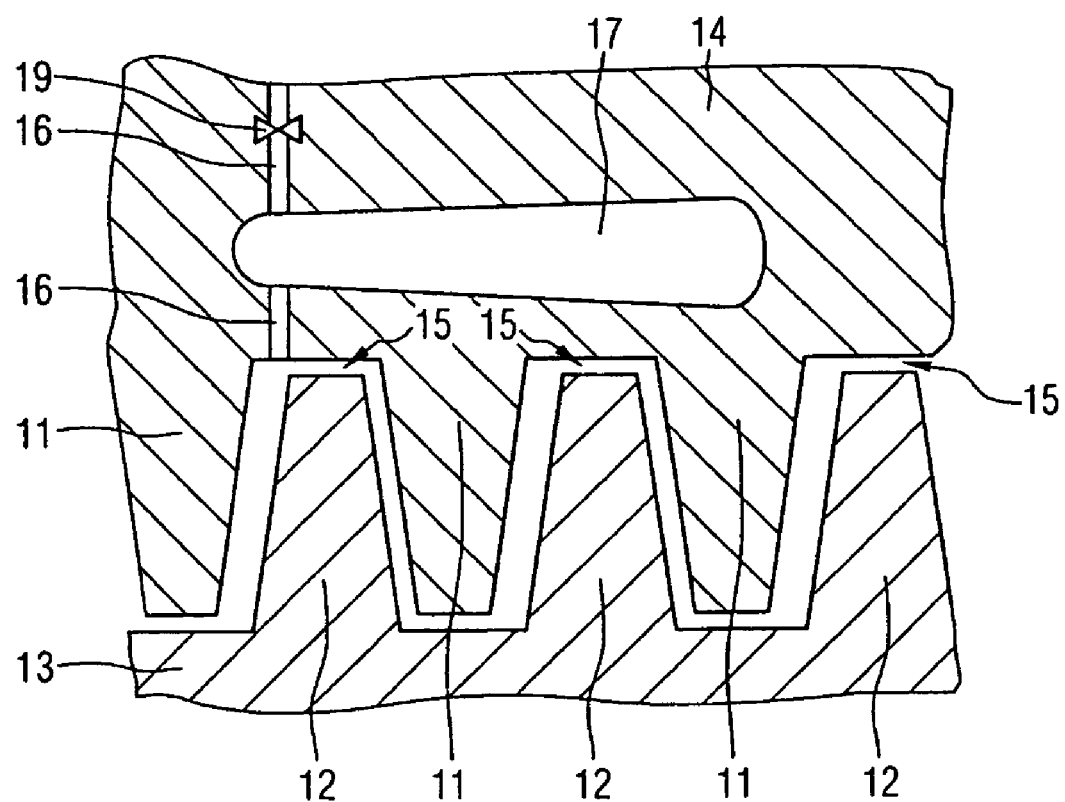
FIG. 3 shows a tap line having an enlarged cavity which is designed in regard to desired thermal influencing of the compressor housing.

FIG. 3 shows essentially the same illustration as FIG. 2. However, the cavity 17 is designed in regard to desired thermal influencing of the compressor housing 14. For this purpose, the cavity 17 is firstly enlarged and, in addition, shaped in such way that it comprises at least the area of two sequential following rotating blades 12 along its longitudinal extension. An especially favorable shape for its function as an insulator results using a cavity 17 designed in this way. The cavity may also be implemented even longer than shown. The size and shape of the cavity are essentially only restricted by the claims on the strength of the compressor housing 14.

Since the compressor 10 also heats up, its cooling is also advisable, particularly in the area of a rear compressor channel. For this purpose, the special design of the cavity 17 shown in FIG. 3 is also advisable, because as the tap air flows through the cavity 17, it absorbs heat of the compressor housing 14 and thus contributes to its cooling.

Figure 4:
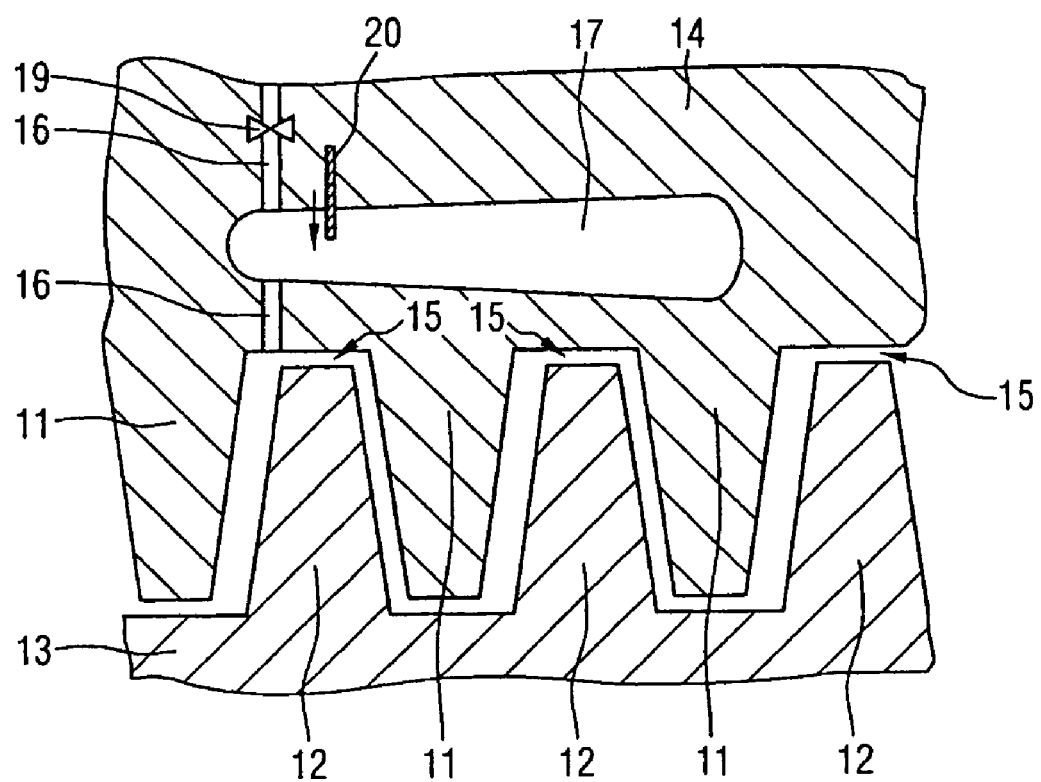
FIG. 4 shows the cavity, which may be sealed off by a locking device.

FIG. 4 shows an illustration supplemented with a locking element 20 in comparison to FIG. 3. During "turn operation" of the gas turbine, which is performed for cooling off following the operation of the gas turbine, the cavity 17 is decoupled from the flow of the compressor channel using the locking element 20 in the form of a bulkhead or the like, whose mobility is illustrated by the vertical arrow. The locking element 20 is situated for this purpose in the area of an entry of the cavity 17, so that the significant part of the volume of the cavity may be partitioned off from the compressor channel by the locking element. The heated compressor air is thus stored even better in the cavity 17, which prevents rapid cooling off of the compressor housing 14 in comparison to the rotor of the gas turbine.

After the cold start of the gas turbine, the cavity 17 has compressor air applied to it in a targeted way so that the compressor stages to the rear in the flow direction (which are thus warmer) are cooled in order to achieve delayed heating of the compressor housing 14 in this way. The heating of the compressor housing 14 then occurs to the same extent as the heating of the rotor.

The present invention may thus be described briefly as follows: a gas turbine having a locking device in a tap line 18 provided for removing cooling air from the compressor 10 is specified, so that the compressor housing 14 may be partitioned off to reduce the cooling off. The housing and rotor cool off to approximately the same extent, so that uniform thermal contraction is provided. Stronger cooling of the housing 14 and thus constriction around the rotor, which cools off more slowly, may be prevented in this way. This makes warm starts subject to less problems, because grazing of the rotor on the housing inner wall, which cools off in the same way as the rotor, is precluded as much as possible.

The invention claimed is:

1. A gas turbine having a compressor, comprising: a compressor housing coaxially surrounding the compressor; a cavity in the housing configured to thermally influence the housing, and
    a tap line in flow communication with the cavity for extracting a portion of a compressed fluid flow of the compressor; and
    a first valve arranged in line with the tap line and downstream of the cavity that locks off the extracted compressed flow through the tap line;
    wherein the tap line has an entrance and an exit and further comprising a second valve arranged between the tap line entrance and the cavity that moves radially inward into the cavity to locks off the extracted compressed flow into the cavity.

2. The gas turbine as claimed in claim 1, wherein the cavity extends downstream from the tap, within the housing, over at least two rows of the compressor blades.

3. The gas turbine as claimed in claim 2, wherein the cavity is radially larger at a downstream end thereof than at an upstream end thereof.

4. An axial flow compressor configured for operation with a gas turbine engine, comprising:
    a compressor rotor arranged along an axis of the compressor;
    a plurality of compressor blades arranged on the rotor in axial stages;
    a compressor housing coaxially surrounding the rotor;
    a cavity in the housing configured to thermally insulate the housing, and
    a tap line in flow communication with the cavity for extracting a portion of a compressed fluid flow of the compressor;
    a plurality of stationary compressor blades secured to the housing arranged in axial stages; and
    a first valve arranged in the tap line downstream of the cavity to block off the flow of removed air;
    a second valve arranged in the cavity and moves radially inward to lock off the extracted compressed flow into the cavity in a close position;
    wherein the first valve is open during operation of the gas turbine, and is closed or partially closed during a shutdown of the gas turbine.

5. The compressor as claimed in claim 4, wherein the tap line has an entrance and an exit, the second valve arranged between the tap line entrance and the cavity.

6. The gas turbine as claimed in claim 4, wherein the cavity extends downstream from the tap, within the housing, over at least two rows of the compressor blades.

7. The gas turbine as claimed in claim 6, wherein the cavity is radially larger at a downstream end thereof than at an upstream end thereof.

\* \* \* \* \*